No. 692,713. Patented Feb. 4, 1902.
B. RUBINSON.
DENTAL MANDREL.
(Application filed May 2, 1900.)
(No Model.)
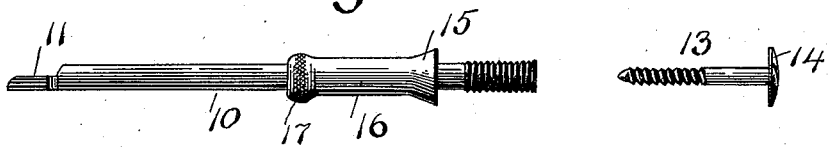
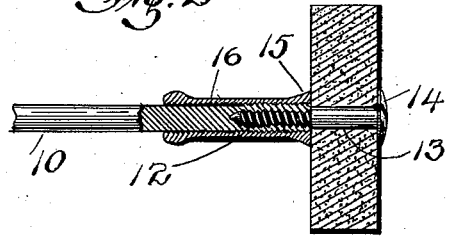
Witnesses:- Horace G. Seitz
Geo. M. Copenhaver.
Inventor:- Bernard Rubinson,
by Arthur W. Harrison
his Attorney.

UNITED STATES PATENT OFFICE.

BERNARD RUBINSON, OF PHILADELPHIA, PENNSYLVANIA.

DENTAL MANDREL.

SPECIFICATION forming part of Letters Patent No. 692,713, dated February 4, 1902.

Application filed May 2, 1900. Serial No. 15,256. (No model.)

*To all whom it may concern:*

Be it known that I, BERNARD RUBINSON, of Philadelphia, in the county of Philadelphia and State of Pennsylvania, have invented new and useful Improvements in Dental Mandrels; and I do hereby declare the following to be a full, clear, and exact description of said invention, reference being had to the accompanying drawings, and to the figures of reference marked thereon, which form a part of this specification.

This invention relates to dental tool-carriers of the type known as "mandrels," which are designed to be rotated by a dental engine and which carry the disk or other grinder or polisher. A mandrel or tool-carrier of this type is usually designed to carry disk-shaped tools of varying thickness, from a thin paper disk to a corundum or emery wheel of a quarter of an inch, more or less, in thickness said corundum or emery wheel being commonly called a "stone." With the most common form of device of this type now in use a screw is threaded into a recess in the end of the mandrel, spindle, or body, said screw being threaded throughout its entire length. With such construction considerable time is required to turn the screw home when a disk is to be clamped between the head of said screw and the end of a spindle or mandrel body, and when a stone is to be clamped some of the threads of the screw must necessarily remain within the stone, resulting in a rapid wearing out of said threads. Furthermore, when the screw is made long enough to leave sufficient threads for engagement with the recess when a stone is clamped the said screw and the recess must be quite long and deep, respectively, thus weakening the spindle, besides requiring considerable time to turn the screw home when a thin paper disk is clamped.

The object of my invention is to provide a device of the character described utilizing a screw with a short thread and employing an outer sleeve or nut on the mandrel-body to bear against one side of the disk or stone, the head of the screw bearing against the other side, thus providing a device which requires very little turning of the screw and which provides a smooth bearing for the stone and which enables a very quick change to be made from one tool to another.

To this end the invention consists in the construction and combination of parts substantially as hereinafter described and claimed.

In the accompanying drawings, Figure 1 represents a side elevation of the mandrel, showing the clamping members or heads separated from each other. Fig. 2 represents a longitudinal section of the device, a corundum wheel or stone being represented as clamped on the mandrel.

Similar numerals of reference indicate similar parts throughout the figures of the drawings.

The spindle or body of the mandrel is represented at 10, having one end 11 flattened and notched or otherwise shaped to adapt it to be rotatively coupled to the driving-shaft of the dental engine. The other or outer end of the body 10 is formed with a screw-threaded socket 12, as is common in dental mandrels, but in the present instance said socket is of less length or depth than is usual, for the reason that my invention renders a deep socket unnecessary, and therefore permits the mandrel-body to retain more of its original strength.

The screw-threads in the socket 12 are right-hand, to receive the threaded portion of the screw 13, having the head 14. Said screw, however, instead of being threaded along its entire length, as is usual, is left smooth for approximately the half its length adjacent to its head, and on this smooth portion the disk or grinder is supported, clamped between the head 14 of the screw and the head or enlarged end 15 of a sleeve or elongated nut 16, fitted to left-hand threads formed externally on the body 10 of the mandrel near its outer end. This threaded portion of the body 10 is slightly larger than the remainder, so that said sleeve or nut may be readily slipped off from the said body when the threads are not in engagement.

When the tool is in use, the direction of rotation is such as to cause the friction of the sides of the disk or stone against the heads 14 15 to increase the clamping action of said heads, owing to the two parts which carry said heads being right and left hand threaded, respectively. When one tool is to be substituted for another on the mandrel, the screw 13 is passed through the tool into the socket 12, and the operator may simply press one finger against the outer surface of the head of the screw 13 and grasp the sleeve or nut 16 between two other fingers, when the rotation of the spindle-body to the right or in the direction in which it is driven by the engine causes the two heads 14 15 to rapidly approach toward each other and grasp the tool. The reverse of this motion enables the clamping members to be rapidly separated from each other and the screw removed, so that the tool can be replaced by another.

The sleeve or nut is preferably formed with a milled enlargement 17 to enable it to be conveniently rotated.

The operation of my device will be readily understood without further description.

Having thus described my invention, I claim—

1. In combination, a threaded mandrel-stem, a nut threaded upon said stem to move longitudinally thereon, and a head provided with a stem having a smooth exterior surface detachably engaging said mandrel-stem, said nut when moved being adapted to approach or recede from said head.

2. A dental mandrel comprising a spindle or body having a screw-threaded socket in its outer end, a screw threaded to said socket and having its head adapted to act as a clamping member for one side of a dental disk or stone, and a sleeve or nut threaded upon said spindle or mandrel-body, the end of said sleeve being adapted to abut against the opposite side of the disk or stone, the said sleeve having a range of movement to clamp either a thin disk or a dental stone.

3. A dental mandrel comprising in its construction a mandrel-body or spindle having a screw-threaded socket in its outer end, a screw having a smooth or unthreaded portion near its head and having a threaded portion fitted to said socket, and a sleeve or nut fitted to external threads upon the outer end of said spindle.

In testimony whereof I affix my signature in presence of two witnesses.

BERNARD RUBINSON.

Witnesses:
DAVID GOODBREAD,
J. JAS. STRATTON.